US011975683B2

(12) United States Patent
Joshi

(10) Patent No.: US 11,975,683 B2
(45) Date of Patent: May 7, 2024

(54) RELATIVE MOVEMENT-BASED SEATBELT USE DETECTION

(71) Applicant: Aptiv Technologies AG, Schaffhausen (CH)

(72) Inventor: Mohit Joshi, Weymouth, MA (US)

(73) Assignee: Aptiv Technologies AG, Schaffhausen (CH)

( * ) Notice: Subject to any disclaimer, the term of this patent is extended or adjusted under 35 U.S.C. 154(b) by 123 days.

(21) Appl. No.: 17/804,665

(22) Filed: May 31, 2022

(65) Prior Publication Data

US 2023/0001885 A1 Jan. 5, 2023

Related U.S. Application Data

(60) Provisional application No. 63/216,839, filed on Jun. 30, 2021.

(51) Int. Cl.
*B60R 22/48* (2006.01)
*B60Q 9/00* (2006.01)

(52) U.S. Cl.
CPC .............. *B60R 22/48* (2013.01); *B60Q 9/00* (2013.01); *B60R 2022/485* (2013.01); *B60R 2022/4866* (2013.01)

(58) Field of Classification Search
CPC .............. B60R 22/48; B60R 2022/485; B60R 2022/4866; B60Q 9/00; G06V 10/62; G06V 40/10; G06V 20/59; G06V 20/597; G06V 10/762; G06V 10/764; G06V 10/82; G06N 20/00
See application file for complete search history.

(56) References Cited

U.S. PATENT DOCUMENTS

| | | | |
|---|---|---|---|
| 8,611,608 | B2 | 12/2013 | Fan et al. |
| 10,691,955 | B1 | 6/2020 | Gracio et al. |
| 10,773,683 | B1 | 9/2020 | Ghannam et al. |

(Continued)

FOREIGN PATENT DOCUMENTS

| | | |
|---|---|---|
| CN | 2756044 | 2/2006 |
| CN | 104417489 A | 3/2015 |

(Continued)

OTHER PUBLICATIONS

"Foreign Office Action", CN Application No. 202110003234.1, dated Sep. 20, 2022, 16 pages.

(Continued)

*Primary Examiner* — Xiao En Mo
(74) *Attorney, Agent, or Firm* — Harness, Dickey & Pierce, P.L.C.

(57) ABSTRACT

The methods and systems herein enable relative movement-based seatbelt use detection. Image data of an occupant of a vehicle is received over time. The image data is then input into a machine-learned model or other module that determines whether relative movement between one or more portions of the occupant and corresponding portions of a seatbelt are less than a threshold amount. If the relative movement is less than the threshold amount, an indication of seatbelt misuse (e.g., a fake seatbelt) is output to a vehicle component. By basing the indication of seatbelt misuse on relative movement between the occupant and the seatbelt, seatbelt use detection may be improved.

20 Claims, 8 Drawing Sheets

(56) References Cited

U.S. PATENT DOCUMENTS

| | | | |
|---|---|---|---|
| 10,953,850 B1* | 3/2021 | Pertsel | B60R 21/01538 |
| 2009/0058061 A1 | 3/2009 | Fuisz et al. | |
| 2017/0240066 A1* | 8/2017 | Wang | B60N 2/002 |
| 2017/0291576 A1 | 10/2017 | Le et al. | |
| 2019/0147262 A1 | 5/2019 | Kuehnle et al. | |
| 2019/0197326 A1 | 6/2019 | Ohno et al. | |
| 2020/0231109 A1 | 7/2020 | Baltaxe et al. | |
| 2020/0298794 A1 | 9/2020 | Dingli | |
| 2020/0298796 A1 | 9/2020 | Cech et al. | |
| 2021/0086715 A1 | 3/2021 | Baek et al. | |
| 2022/0227331 A1 | 7/2022 | Uszkur et al. | |

FOREIGN PATENT DOCUMENTS

| | | |
|---|---|---|
| CN | 104700068 A | 6/2015 |
| CN | 105109448 A | 12/2015 |
| CN | 105667450 A | 6/2016 |
| CN | 105946786 B | 12/2018 |
| CN | 109886205 A | 6/2019 |
| CN | 110053582 A | 7/2019 |
| DE | 10133759 C2 | 7/2003 |
| DE | 10326840 A1 | 12/2004 |
| DE | 102007008602 A1 | 11/2007 |
| DE | 102016014867 A1 | 6/2017 |
| DE | 102019101355 A1 | 7/2019 |
| DE | 102019211200 A1 | 2/2021 |
| EP | 1980452 A1 | 10/2008 |
| EP | 2937251 A1 | 10/2015 |
| FR | 2877279 A1 | 5/2006 |
| JP | 2007055294 A | 3/2007 |
| JP | 2010113506 A | 5/2010 |
| JP | 2015066983 A | 4/2015 |
| JP | 2020073372 A | 5/2020 |
| WO | 2018213346 A1 | 11/2018 |

OTHER PUBLICATIONS

"Extended European Search Report", EP Application No. 20214085.1, dated Jun. 9, 2021, 7 pages.

"Extended European Search Report", EP Application No. 21215512.1, dated Jun. 3, 2022, 7 pages.

"Extended European Search Report", EP Application No. 22178711.2, dated Nov. 9, 2022, 8 pages.

"Extended European Search Report", EP Application No. 20150594.8, dated Jul. 17, 2020, 7 pages.

"Search Report", GB Application No. 2100619.2, dated Jun. 18, 2021, 1 page.

* cited by examiner

RELATIVE MOVEMENT-BASED SEATBELT USE DETECTION

CROSS-REFERENCE TO RELATED APPLICATION

This application claims the benefit under 35 U.S.C. 119(e) of U.S. Provisional Application No. 63/216,839, filed Jun. 30, 2021, the disclosure of which is hereby incorporated by reference in its entirety herein.

BACKGROUND

Seatbelt use detection systems have been implemented in a wide variety of vehicles. For example, many vehicles have detection sensors built into seatbelt latches that trigger an alert when the vehicles are driving without a seatbelt clip inserted. Such systems can be fooled by occupants placing fake seatbelt clips (e.g., not connected to seatbelts) into the buckles.

More recently, advanced systems of seatbelt misuse detection have been developed. For example, some systems have been developed that determine whether seatbelts cross chests of occupants. These systems can also be fooled by occupants wearing shirts with prints of seatbelts on them (e.g., a stripe going across their chest).

SUMMARY

This document is directed to techniques and hardware for relative movement-based seatbelt use detection. The techniques may include one or more methods for relative movement-based seatbelt use detection. The hardware may include means (e.g., one or more processors) of performing relative movement-based seatbelt use detection. The hardware may also include computer-readable media (e.g., non-transitory storage media) comprising instructions that, when executed, cause one or more associated systems to perform relative movement-based seatbelt use detection.

Some aspects described below include a method. The method includes receiving, from one or more sensors, sensor data indicating attributes of an interior of a vehicle. The method also includes determining, based on the sensor data, that a seatbelt is crossing a chest of an occupant of the vehicle. The method further includes tracking, based on the sensor data, one or more occupant portions of the occupant over time and one or more seatbelt portions of the seatbelt over time. The seatbelt portions correspond to respective ones of the occupant portions. The method also includes determining, based on the tracking, relative movements between the occupant portions and their corresponding seatbelt portions. The method further includes establishing, based on the relative movements, that the seatbelt is a fake seatbelt and outputting, to a vehicle system of the vehicle, an indication of the fake seatbelt.

Some aspects described below include another method. The other method includes receiving image data over time from one or more cameras with fields of view that include an occupant of a vehicle. The other method also includes inputting at least a portion of the image data into a machine-learned model that is trained to look for relative movement between one or more occupant portions of the occupant and respective seatbelt portions of a seatbelt that correspond to the occupant portions. The other method further includes receiving, from the machine-learned model, an indication that the relative movement indicates that the seatbelt is a fake seatbelt and outputting, to a vehicle system of the vehicle, an indication of the fake seatbelt.

Some aspects described below include one or more components and/or one or more systems comprising one or more processors configured to perform the above methods, portions thereof, and/or other methods, flows, and techniques described below. Some aspects described below also include computer-readable media (e.g., non-transitory storage media) including instructions that, when executed (e.g., by the processors of the components and/or systems), implement the above methods, portions thereof, and/or other methods, flows, and techniques described below.

This Summary introduces simplified concepts of relative movement-based seatbelt use detection that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and methods of relative movement-based seatbelt use detection are described with reference to the following drawings that use some of the same numbers throughout to reference like or examples of like features and components.

DETAILED DESCRIPTION

Overview

Many seatbelt-use detection systems may be fooled into determining that an occupant is properly wearing a seatbelt when they are not. For example, some vision-based systems can be fooled by an occupant wearing a shirt with a seatbelt printed on it. Fooling such systems (e.g., wearing a seatbelt shirt instead of properly using a seatbelt) is not only illegal in many cases, it is also unsafe.

The methods and systems herein enable relative movement-based seatbelt use detection. Image data of an occupant of a vehicle is received over time. The image data is then input into a machine-learned model or other module that determines whether relative movement between one or more portions of the occupant and corresponding portions of a seatbelt are less than a threshold amount. If the relative movement is less than the threshold amount, an indication of seatbelt misuse is output to a vehicle component. By basing the indication of seatbelt misuse on relative movement between the occupant and the seatbelt, seatbelt use detection may be improved. Improving seatbelt use detection may increase safety and legality in many environments.

Example Environment

Figure 1:
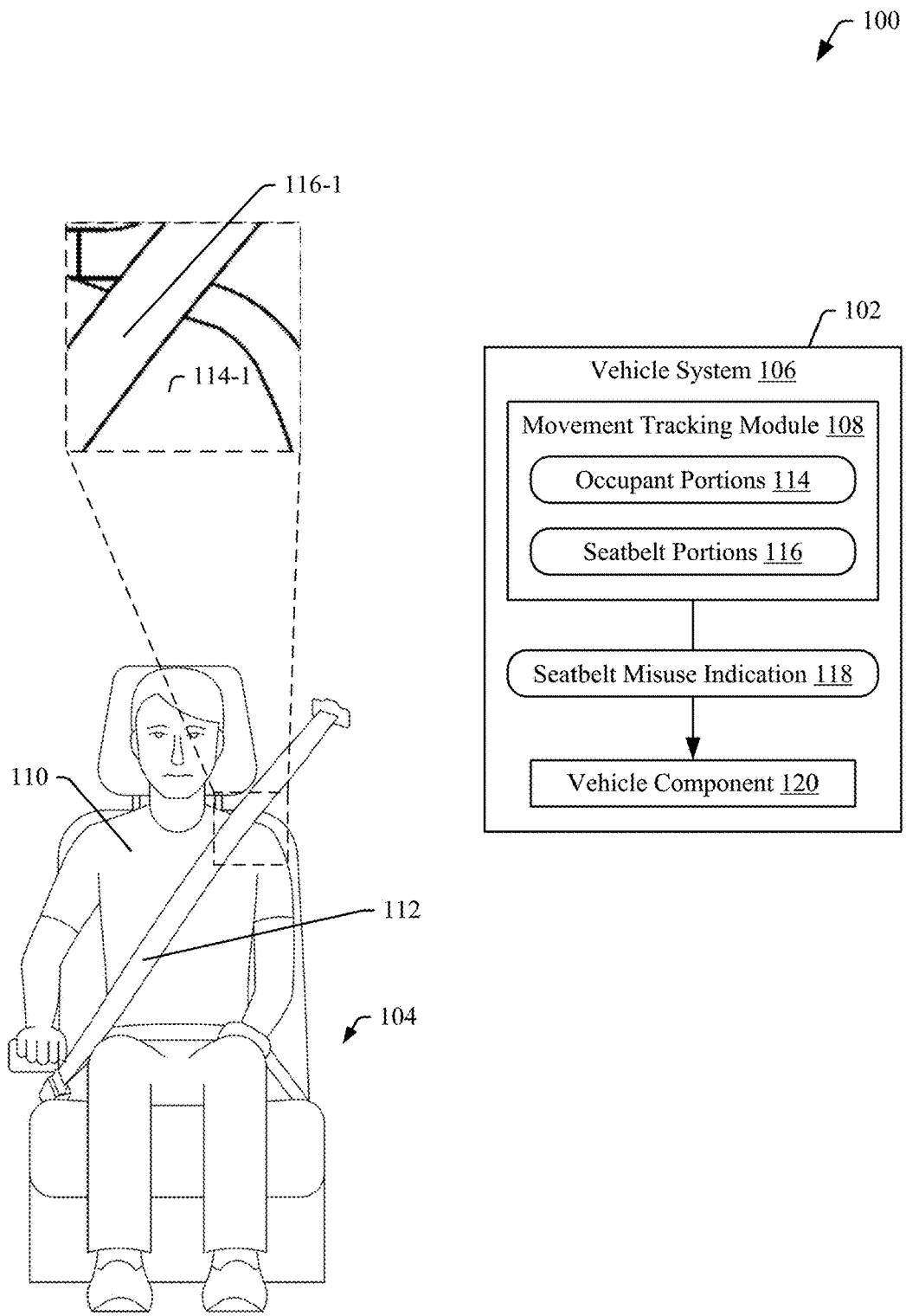
FIG. 1 illustrates, in accordance with this disclosure, an example environment where relative movement-based seatbelt use detection may be used and an example flow of relative movement-based seatbelt use detection.

FIG. 1 illustrates an example environment 100 where relative movement-based seatbelt use detection may be used. FIG. 1 also illustrates an example flow 102 of relative movement-based seatbelt use detection. The example environment 100 is within a vehicle 104 (not shown). The vehicle 104 may be any type of object that utilizes seatbelts (taxi, car, truck, motorcycle, e-bike, boat, air vehicle, and so on). The vehicle 104 contains a vehicle system 106 that is configured to perform relative movement-based seatbelt use detection.

The vehicle system 106 contains a movement tracking module 108 that receives image data and tracks positions of an occupant 110 and a seatbelt 112 associated with the occupant 110 (e.g., corresponding to a seat the occupant 110 is sitting in). Specifically, the movement tracking module 108 tracks one or more occupant portions 114 and one or more seatbelt portions 116 that correspond to respective occupant portions 114.

For example, as illustrated, one of the occupant portions 114 (e.g., occupant portion 114-1) may correspond to a shoulder of the occupant 110 (left shoulder or right shoulder depending upon a configuration of the seatbelt 112, seat location, whether the vehicle 104 is right or left-hand drive, etc.), and the corresponding seatbelt portion 116 (e.g., seatbelt portion 116-1) may be a portion of the seatbelt 112 that crosses that shoulder. Another of the occupant portions 114 may correspond to a hip of the occupant 110 (left hip or right hip depending upon the configuration of the seatbelt 112), and the corresponding seatbelt portion 116 may be a portion of the seatbelt 112 that crosses that hip.

Although illustrated as being on a single side of a seatbelt portion 116, an occupant portion 114 may be on both sides of the corresponding seatbelt portion 116 (e.g., partially surrounding it) either initially or as the occupant 110 moves. As the occupant 110 moves, a seatbelt portion 116 may move under the corresponding seatbelt portion (if it is not configured to be under or around the seatbelt portion 116 to begin with). Furthermore, the occupant portion 114 may be on the opposite side of the seatbelt portion 116. Those of ordinary skill will realize that any number of techniques may be used to isolate the occupant portions 114 and their corresponding seatbelt portions 116 from the image data.

The movement tracking module 108 is configured to track relative movement or motion between the occupant portions 114 and their corresponding seatbelt portions 116. Any number of known techniques may be used to determine relative movement (e.g., pixel shift, point tracking, tracks, point tracking, centroid tracking).

The movement tracking module 108 may generate a seatbelt misuse indication 118 that indicates a misuse of the seatbelt 112 or that the seatbelt 112 is fake responsive to determining that the relative movement between one or more of the occupant portion/seatbelt portion pairs does not indicate a real seatbelt. For example, if the seatbelt 112 is fake (e.g., it's printed on a shirt), the seatbelt portions 116 may move with the occupant portions 114. However, if the seatbelt 112 is real, the occupant portions 114 may move independently of their corresponding seatbelt portions 116.

Any number of techniques may be used to determine when to generate the seatbelt misuse indication 118. For example, the movement tracking module 108 may determine that an average relative movement between some or all of the occupant portion/seatbelt portion pairs is less than a threshold value, that a single relative movement between one of the occupant portion/seatbelt portion pairs is less than the threshold value (or another value), that a sum of the relative movement between some or all of the occupant portion/seatbelt portion pairs is less than a threshold value, or any other way of thresholding an amount of movement between the occupant 110 and the seatbelt 112.

The seatbelt misuse indication 118 may be received by a vehicle component 120 that is configured to cause an alert (e.g., visual, auditory, haptic) to the occupant 110 or a driver of the vehicle 104 (if the occupant 110 is not the driver) that the occupant 110 is not properly seat belted. Furthermore, the vehicle component 120 may send a notification to an external system that may alert a third party (e.g., parent, insurance company, law enforcement) of the seatbelt misuse. The vehicle component 120 may also receive a seatbelt use indication from the movement tracking module 108 that indicates a proper seatbelt use. The seatbelt use indication may cause the vehicle component 120 to refrain from performing any additional actions (e.g., the alert).

By tracking relative movement/movement between occupant portions 114 and their corresponding seatbelt portions 116, the vehicle system 106 is able to detect fake seatbelts (e.g., those printed on shirts) that may fool conventional seatbelt detection systems. Doing so may increase the safety of occupants (e.g., the occupant 110) through increased proper use of seatbelts (e.g., because the alert is worse for the occupant 110 than wearing the seatbelt 112).

Example System

Figure 2:
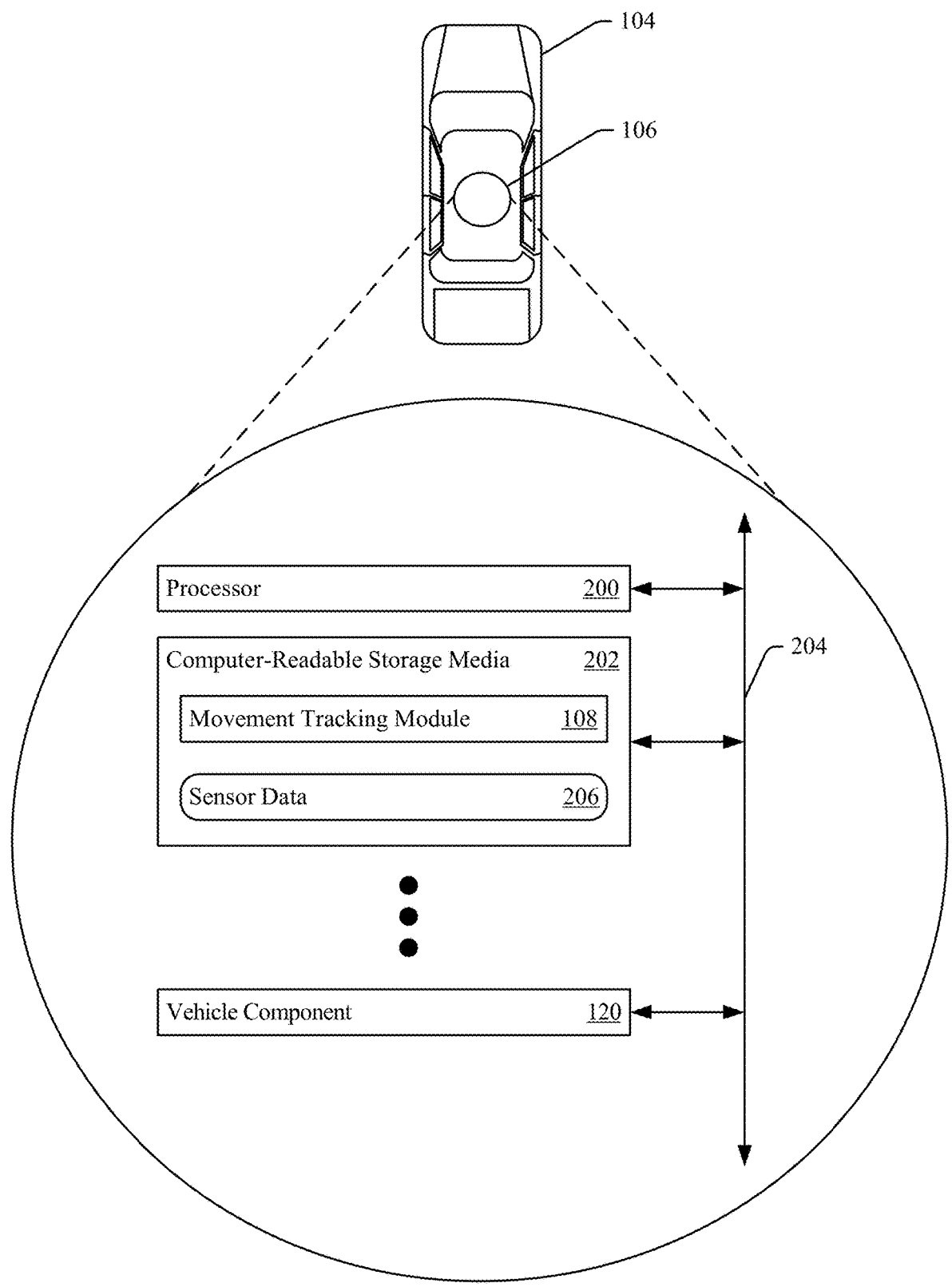
FIG. 2 illustrates, in accordance with this disclosure, an example of a vehicle system configured for relative movement-based seatbelt use detection.

FIG. 2 illustrates an example of the vehicle system 106. Components of the vehicle system 106 may be arranged anywhere within or on the vehicle 104. The vehicle system 106 may include at least one processor 200, computer-readable storage media 202 (e.g., media, medium, mediums), and the vehicle component 120. The components are operatively and/or communicatively coupled via a link 204.

The processor 200 (e.g., application processor, microprocessor, digital-signal processor (DSP), controller) is coupled to the computer-readable storage media 202 via the link 204 and executes computer-executable instructions (e.g., code) stored within the computer-readable storage media 202 (e.g., non-transitory storage device such as a hard drive, solid-state drive (SSD), flash memory, read-only memory (ROM)) to implement or otherwise cause the movement tracking module 108 (or a portion thereof) to perform the techniques described herein. Although shown as being within the computer-readable storage media 202, the movement tracking module 108 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 200 and the computer-readable storage media 202 may be any number of components, comprise multiple components distributed throughout the vehicle 104, located remote to the vehicle 104, dedicated or shared with other components, modules, or systems of the vehicle 104, and/or configured differently than illustrated without departing from the scope of this disclosure.

The computer-readable storage media 202 also contains sensor data 206 generated by one or more sensors or types of sensors (not shown) that may be local or remote to the vehicle system 106. The sensor data 206 indicates or otherwise enables the determination of information usable to perform the techniques described herein. For example, the sensors may generate sensor data 206 indicative of aspects usable to determine when to generate the seatbelt misuse indication 118. In some implementations, the sensor data 206 may come from a remote source (e.g., via link 204). The vehicle system 106 may contain a communication system (not shown) that receives sensor data 206 from the remote source.

The vehicle component 120 contains one or more systems or components that are communicatively coupled to the movement tracking module 108 and configured to perform one or more vehicle functions based on receiving an indication of the seatbelt misuse indication 118. For example, the vehicle component 120 may comprise an advanced driver assistance system (ADAS) or autonomous driving system that can change an operation based on the seatbelt misuse indication 118 (e.g., not allow autonomous vehicle control). In another example, the vehicle component 120 may comprise an alert system that provides a visual, auditory, and/or haptic alert to the occupant based on the seatbelt misuses indication 118. The vehicle component 120 is communicatively coupled to the movement tracking module 108 via the link 204. Although shown as separate components, the movement tracking module 108 may be part of the vehicle component 120 and visa-versa.

Example Flows

Figure 3:
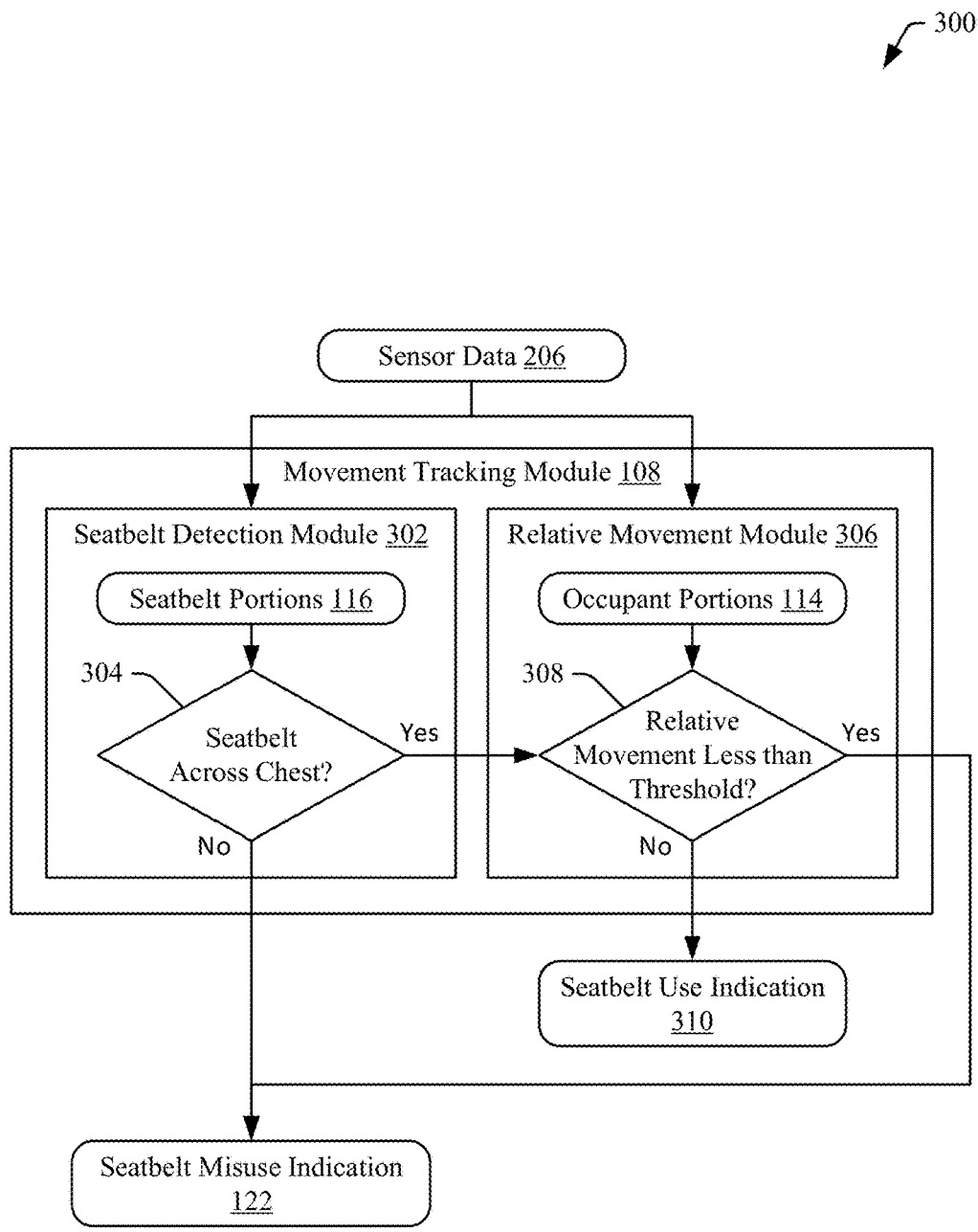
FIG. 3 illustrates, in accordance with this disclosure, an example flow of generating a seatbelt misuse indication.

FIG. 3 is an example flow 300 of relative movement-based seatbelt use detection. The example flow 300 may be implemented in any of the previously described environments and by any of the previously described systems or components. For example, the example flow 300 can be implemented in the example environment 100 and/or by the vehicle system 106. The example flow 300 may also be implemented in other environments, by other systems or components, and utilizing other flows or techniques. The example flow 300 may be implemented by any number of entities. The order in which the operations are shown and/or described is not intended to be construed as a limitation, and the order may be rearranged without departing from the scope of this disclosure. Furthermore, any number of the operations can be combined with any other number of the operations to implement the example flow or an alternate flow.

The example flow 300 starts with the movement tracking module 108 receiving the sensor data 206. The sensor data 206 may be camera or image data (e.g., visible image data, infrared image data) of the occupant 110 from one or more image sensors. A seatbelt detection module 302 of the movement tracking module 108 determines and tracks the seatbelt portions 116. The seatbelt portions 116 may correspond to any portion of the seatbelt 112. For example, the seatbelt detection module 302 may determine and track the seatbelt portion 116-1 near a shoulder of the occupant 110 and another seatbelt portion 116-2 near a hip of the occupant. In another example, the seatbelt portions 116 may include a portion from a shoulder of the occupant 110 to a b-pillar of the vehicle 104 and/or a portion from a hip of the occupant 110 to a seatbelt receiver corresponding to the seatbelt 112. Furthermore, different seatbelt portions 116 may be used for different steps of the relative movement-based seatbelt use detection.

At decision 304 the seatbelt detection module 302 determines if the seatbelt 112 is across a chest of the occupant 110. For example, if the seatbelt portions 116-1 and 116-2 are not found, the decision 304 may be a no. The seatbelt detection module 302 may alternatively or in addition, look for another seatbelt portion 116-3 that is in a middle of the chest of the occupant 110. In some implementations, the seatbelt detection module 302 may determine if a stripe is crossing the chest of the occupant 110, indicating that a seatbelt is crossing it. If the seatbelt portion 116-3 is not found, the decision 304 may be a no.

If it is determined that the seatbelt 112 is not across the chest of the occupant 110 (e.g. a no out of decision 304), the seatbelt detection module 302 may generate or otherwise cause the seatbelt misuse indication 122. However, if it is determined that the seatbelt 112 is across the chest of the occupant 110 (e.g., a yes out of decision 304), the seatbelt detection module 302 may send or otherwise indicate the positions of the seatbelt portions 116 to a relative movement module 306.

The relative movement module 306 determines locations, and tracks movement of, the occupant portions 114 that correspond to the seatbelt portions 116. For example, the relative movement module 306 may track occupant portion 114-1 and/or other occupant portions. The relative movement module 306 also compares the movement of the occupant portions 114 relative to their corresponding seatbelt portions 116. For example, the relative movement module 306 may determine a relative movement between the occupant portion 114-1 and the seatbelt portion 116-1.

At decision 308, the relative movement module 306 determines if the relative movement is less than a threshold. For example, the decision may be based on a single of the relative movements (e.g., between only one seatbelt portion 116 and occupant portion 114) or a combination of the relative movements (e.g., an average, median, sum). If the relative movement is greater than (or equal to depending on implementation) the threshold, then the decision 308 may be no, indicating a proper seatbelt use indication (e.g., seatbelt use indication 310). In some implementations, a no out of decision 308 may cause the relative movement module 306 to refrain from outputting an indication. If the relative movement is less than the threshold (or equal to depending on implementation), then the decision 308 may be yes, indicating or establishing a misuse of the seatbelt 112 or that the seatbelt 112 is fake. The yes decision may cause the relative movement module 306 to generate the seatbelt misuse indication 122.

Figure 4:
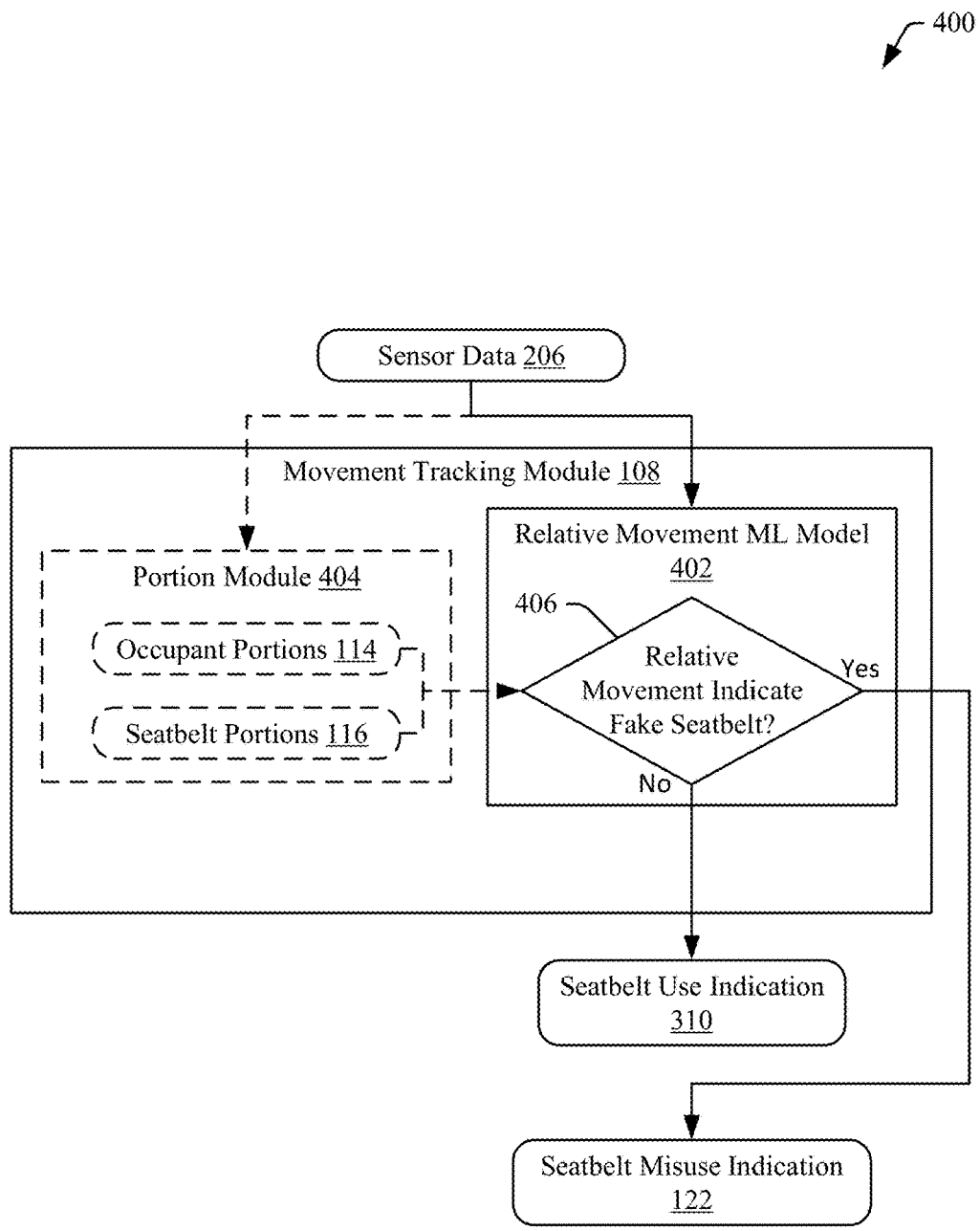
FIG. 4 illustrates, in accordance with this disclosure, another example flow of generating a seatbelt misuse indication.

FIG. 4 is an example flow 400 of relative movement-based seatbelt use detection. The example flow 400 may be implemented in any of the previously described environments and by any of the previously described systems or components. For example, the example flow 400 can be implemented in the example environment 100 and/or by the vehicle system 106. The example flow 400 may also be implemented in other environments, by other systems or components, and utilizing other flows or techniques. The example flow 400 may be implemented by any number of entities. The order in which the operations are shown and/or described is not intended to be construed as a limitation, and the order may be rearranged without departing from the scope of this disclosure. Furthermore, any number of the operations can be combined with any other number of the operations to implement the example flow or an alternate flow.

The example flow 400 starts with the movement tracking module 108 receiving the sensor data 206. The sensor data 206 may be camera or image data (e.g., visible image data, infrared image data) of the occupant 110 from one or more image sensors. A relative movement machine learned (ML) model 402 tracks the relative movement between the seatbelt 112 and the occupant 110 and determines whether the relative movement indicates a fake seatbelt. In some implementations, the relative movement ML model 402 may determine and track the occupant portions 114 and seatbelt portions 116. In other implementations, the relative movement ML model 402 may look at the sensor data 206 as a whole. Furthermore, the movement tracking module 108 may use a portion module 404 to determine which portions of the sensor data 206 to input into the relative movement ML model 402 (e.g., the portions that contain the occupant portions 114 and the seatbelt portions 116).

The relative movement ML model 402 may be trained using training sensor data of occupants moving in car seats with real seatbelts on and operated correctly and with fake seatbelts on. The relative movement ML model may be configured to receive the sensor data 206 and differentiate between situations where relative movement indicates seatbelt misuse and normal seatbelt use. The seatbelt portions 116 may correspond to any portion of the seatbelt 112. For example, the seatbelt detection module 302 may determine and track the seatbelt portion 116-1 near a shoulder of the occupant 110 and another seatbelt portion 116-2 near a hip of the occupant.

The relative movement ML model 402 may be implemented and/or trained using any techniques known by those in the art. For example, supervised learning, unsupervised learning, and/or reinforcement learning may be used. Furthermore, the relative movement ML model 402 may be implemented as a classification model (e.g., a binary classification model with seatbelt use/misuse as the outcomes), a regression model, and/or a clustering model. The relative movement ML model 402 may also be trained using deep learning techniques and/or comprise one or more neural networks.

Regardless of how the relative movement ML model 402 is trained and/or implemented, it determines, at decision 406, whether the relative movement between the occupant 110 and the seatbelt 112 indicate that the seatbelt 112 is a real seatbelt (relative movement exists or passes a threshold, e.g., no from decision 406) or a fake seatbelt (relative movement does not exist or does not pass the threshold, e.g., yes from decision 406). If the decision 406 is no, then the relative movement ML model 402 may generate, or otherwise cause a generation of, the seatbelt use indication 310 or refrain from performing additional action. If the decision 406 is yes, then the relative movement ML model 402 may establish that the seatbelt is fake or misused and generate or otherwise cause a generation of the seatbelt misuse indication 122.

Figure 5:
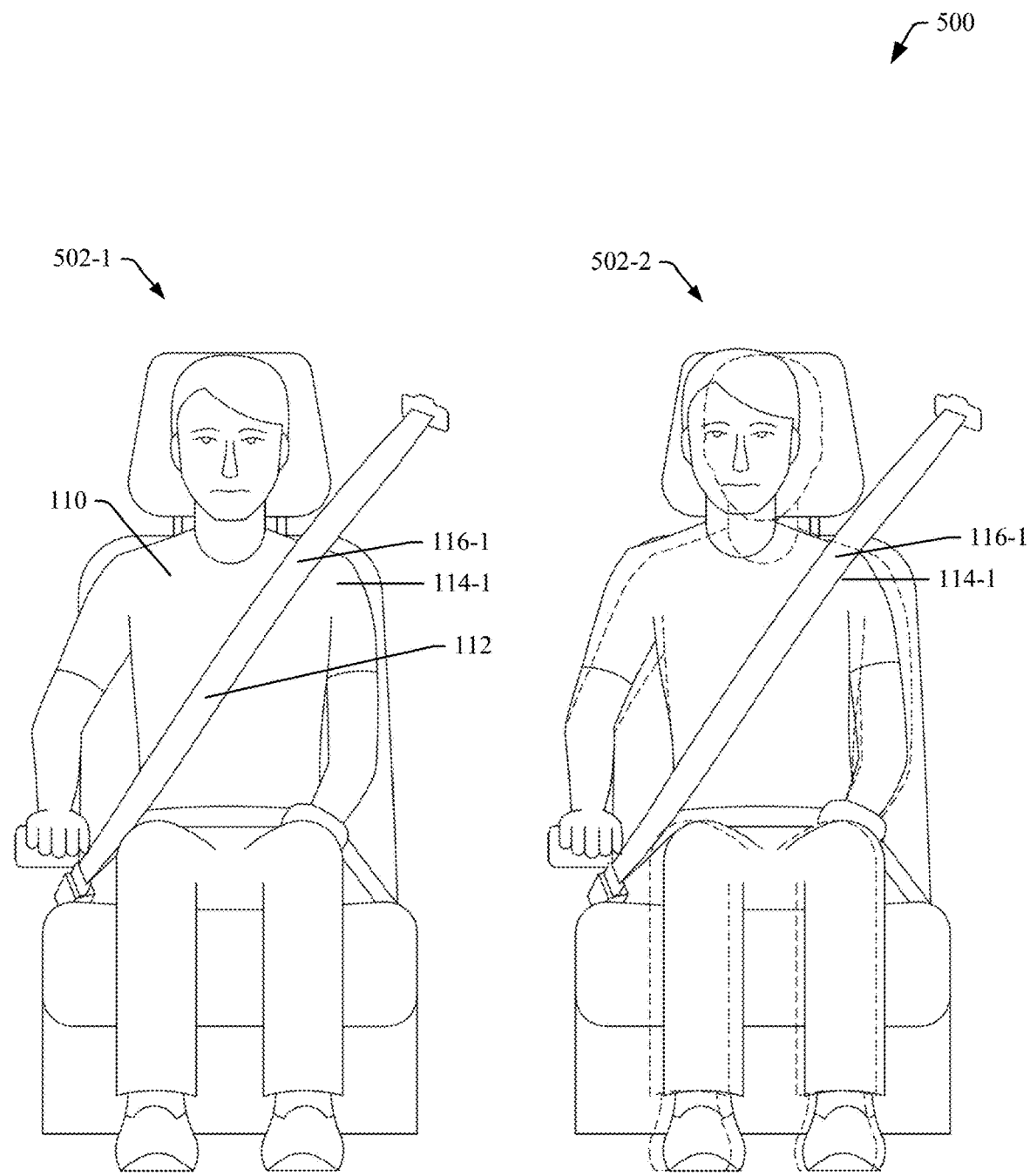
FIG. 5 illustrates, in accordance with this disclosure, an example of an environment where a seatbelt use indication may be generated.

FIG. 5 is an example illustration 500 of a large relative movement between the occupant 110 and the seatbelt 112 (e.g., enough to not trigger the seatbelt misuse indication 122) when the seatbelt 112 is a real seatbelt and routed properly (e.g., across the chest of the occupant 110). The example illustration 500 illustrates the occupant 110 and the seatbelt 112 at times 502-1 and 502-2. As can be seen, the occupant portion 114-1 has shifted relative to the seatbelt portion 116-1 from time 502-1 to 502-2. When the seatbelt 112 is real and properly routed, it moves slightly compared to movement of the occupant 110. In other words, the occupant 110 moves under the seatbelt 112 without generally moving the seatbelt 112, at least within the plane shown. The example illustration 500 may cause the movement tracking module 108 to generate the seatbelt use indication 310, refrain from generating the seatbelt misuse indication 122, or refrain from performing any additional operations.

Figure 6:
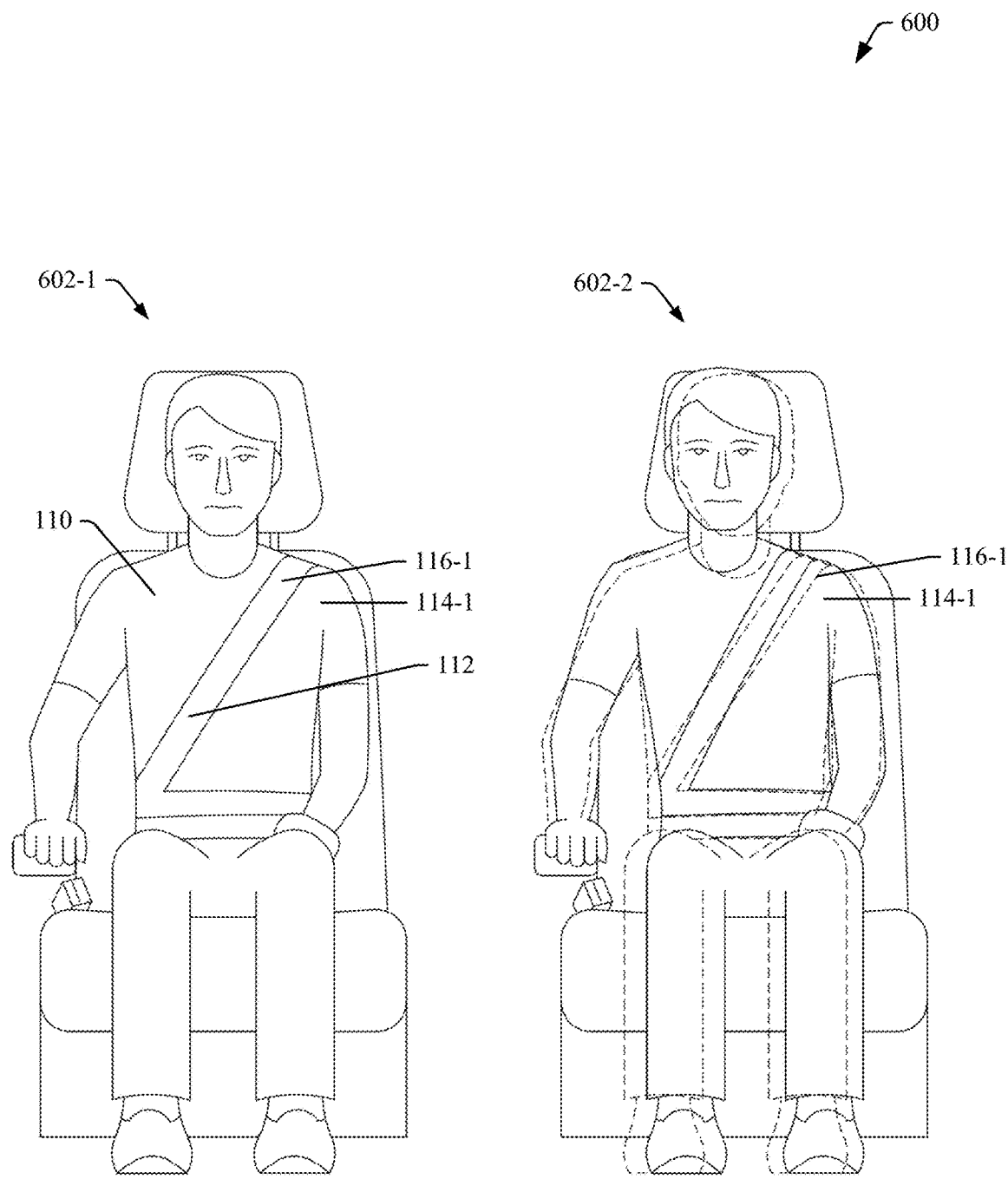
FIG. 6 illustrates, in accordance with this disclosure, an example of an environment where a seatbelt misuse indication may be generated.

FIG. 6 is an example illustration 600 of no or little relative movement between the occupant 110 and the seatbelt 112 (e.g., low enough to trigger the seatbelt misuse indication 122) when the seatbelt 112 is a fake seatbelt. The example illustration 600 illustrates the occupant 110 and the seatbelt 112 at times 602-1 and 602-2. As can be seen, the occupant portion 114-1 has moved with the seatbelt portion 116-1 from time 502-1 to 502-2. When the seatbelt 112 is fake, it moves in conjunction with movement of the occupant 110. The occupant portion 114-1 moved, but the seatbelt portion 114-1 moved as well. Thus, the relative movement is small indicating a fake seatbelt. The example illustration 600 may cause the movement tracking module 108 to generate the seatbelt misuse indication 122.

Example Methods

Figure 7:
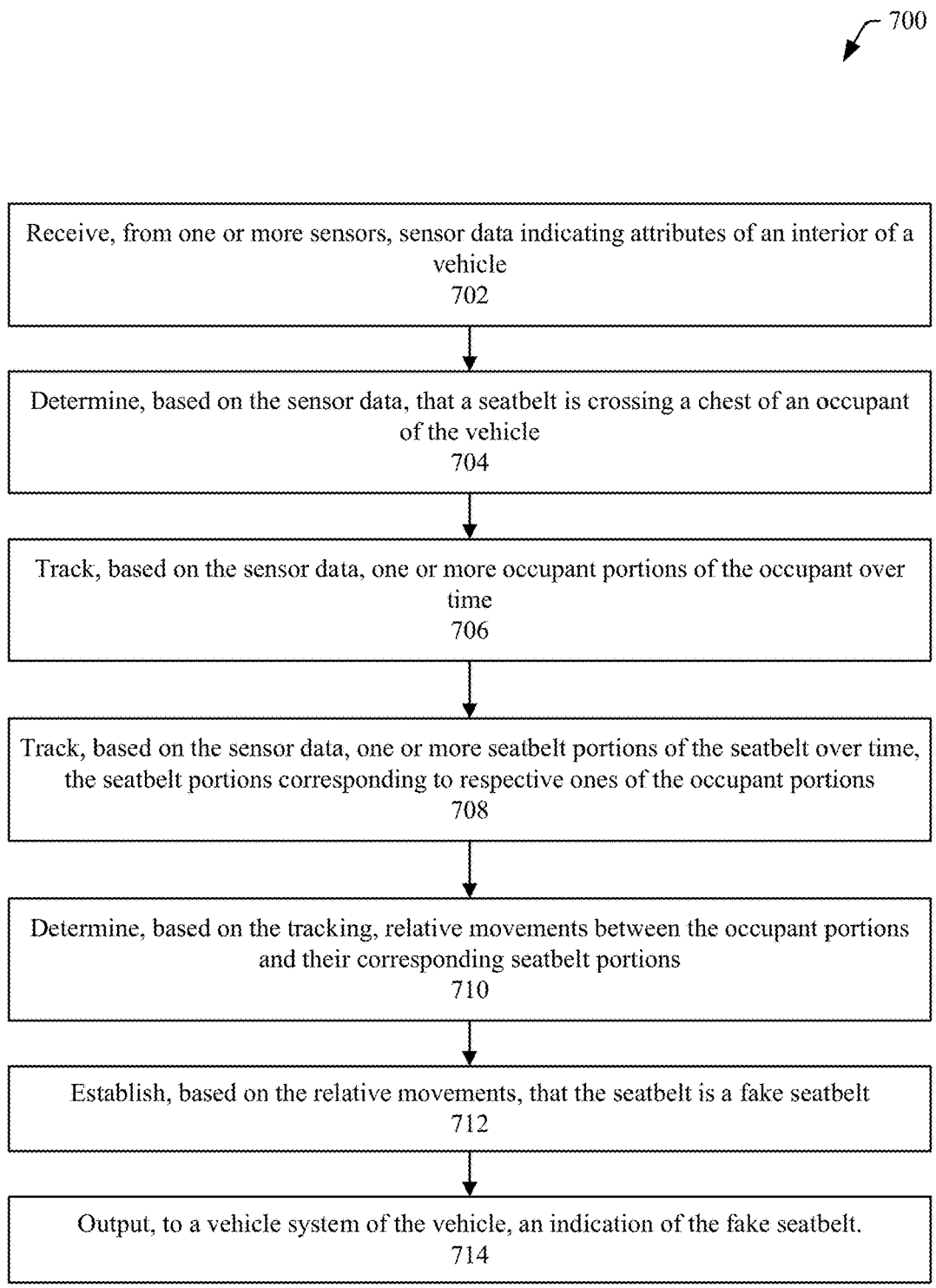
FIG. 7 illustrates, in accordance with this disclosure, an example method of relative movement-based seatbelt use detection.

FIG. 7 is an example method 700 for relative movement-based seatbelt use detection. The example method 700 may be implemented in any of the previously described environments, by any of the previously described systems or components, and by utilizing any of the previously described flows, process flows, or techniques. For example, the example method 700 can be implemented in the example environment 100, by the vehicle system 106, and/or by following the example flow 300. The example method 700 may also be implemented in other environments, by other systems or components, and utilizing other flows, process flows, or techniques. Example method 700 may be implemented by one or more entities (e.g., the movement tracking module 108). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 702, sensor data indicating attributes of an interior of a vehicle is received from one or more sensors. For example, the movement tracking module 108 may receive the sensor data 206 from one or more cameras.

At 704, it is determined that a seatbelt is crossing a chest of an occupant of the vehicle based on the sensor data. For example, the seatbelt detection module 302 may determine, at decision 304, that the seatbelt 112 is crossing a chest of the occupant 110.

At 706, one or more occupant portions of the occupant are tracked over time based on the sensor data. For example, the relative movement module 306 may track the occupant portions 114 of the occupant 110.

At 708, one or more seatbelt portions of the seatbelt are tracked over time. The seatbelt portions correspond to respective ones of the occupant portions. For example, the seatbelt detection module 302 may track the seatbelt portions 116 that correspond to the occupant portions 114.

At 710, relative movements between the occupant portions and their corresponding seatbelt portions are determined based on the tracking. For example, the relative movement module 306 may compare the movements of the occupant portions 114 to their corresponding seatbelt portions 116.

At 712, it is established that the seatbelt is a fake seatbelt based on the relative movements. For example, the relative movement module 306 may determine, at decision 308, that the relative movement is less than a threshold amount.

At 714, an indication of the fake seatbelt is output to a vehicle system of the vehicle. For example, the relative movement module 306 may generate the seatbelt misuse indication 122 for receipt by the vehicle component 120.

Figure 8:
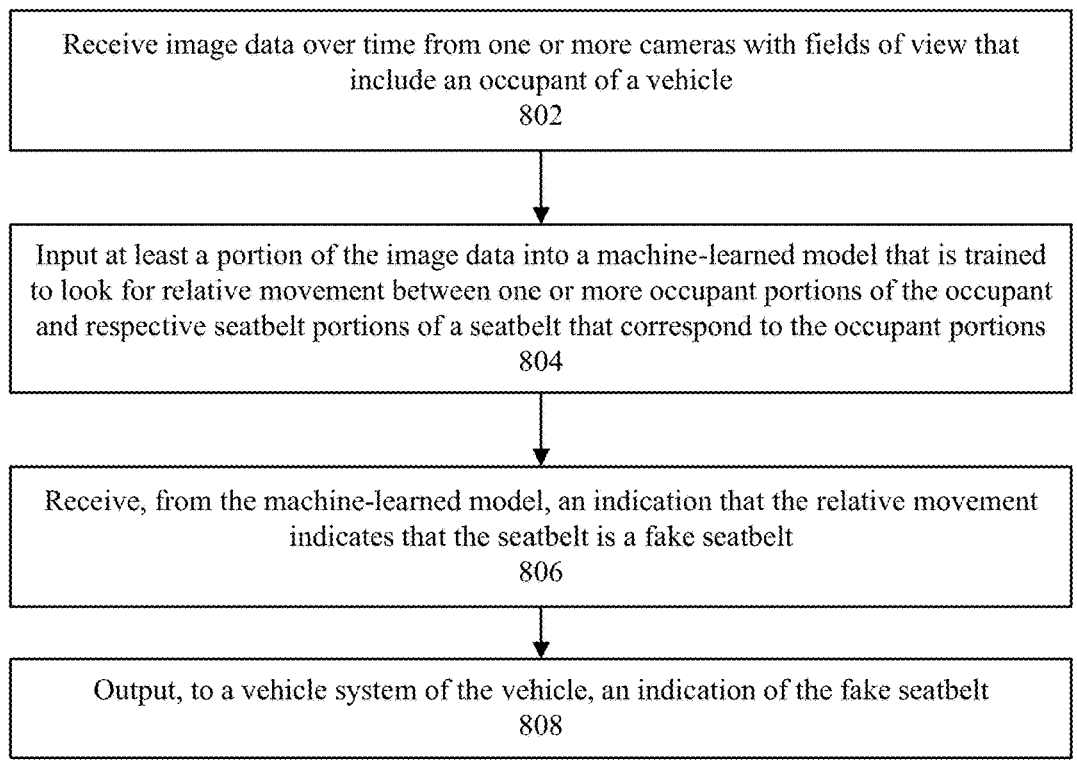
FIG. 8 illustrates, in accordance with this disclosure, another example method of relative movement-based seatbelt use detection.

FIG. 8 is an example method 800 for relative movement-based seatbelt use detection. The example method 800 may be implemented in any of the previously described environments, by any of the previously described systems or components, and by utilizing any of the previously described flows, process flows, or techniques. For example, the example method 800 can be implemented in the example environment 100, by the vehicle system 106, and/or by following the example flow 400. The example method 800 may also be implemented in other environments, by other systems or components, and utilizing other flows, process flows, or techniques. Example method 800 may be implemented by one or more entities (e.g., the movement tracking module 108). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 802, image data is received over time from one or more cameras with fields of view that include an occupant of a vehicle. For example, the movement tracking module 108 may receive the sensor data 206 from one or more cameras within the vehicle 104 with fields of view of the occupant 110.

At 804, at least a portion of the image data is input into a machine-learned model that is trained to look for relative motion between one or more occupant portions of the occupant and respective seatbelt portions of a seatbelt that correspond to the occupant portions. For example, the movement tracking module 108 may input the sensor data 206, or a portion thereof, into the relative movement ML model 402.

At 806, an indication that the relative movement indicates that the seatbelt is a fake seatbelt is received from the machine-learned model. For example, the relative movement ML model 402 may determine, at decision 406, that the relative movement indicates a fake seatbelt and provide an indication of the decision to the movement tracking module 108.

At 808, an indication of the fake seatbelt is output to a vehicle system of the vehicle. For example, the movement tracking module 108 may generate the seatbelt misuse indication 122 for receipt by the vehicle component 120.

FURTHER EXAMPLES

Some additional examples for leveraging relative movement-based seatbelt use detection are provided below.

Example 1: A method comprising: receiving, from one or more sensors, sensor data indicating attributes of an interior of a vehicle; determining, based on the sensor data, that a seatbelt is crossing a chest of an occupant of the vehicle; tracking, based on the sensor data, one or more occupant portions of the occupant over time; tracking, based on the sensor data, one or more seatbelt portions of the seatbelt over time, the seatbelt portions corresponding to respective ones of the occupant portions; determining, based on the tracking, relative movements between the occupant portions and their corresponding seatbelt portions; establishing, based on the relative movements, that the seatbelt is a fake seatbelt; and outputting, to a vehicle system of the vehicle, an indication of the fake seatbelt.

Example 2: The method of example 1, wherein the sensor data comprises visible or infrared image data.

Example 3: The method of example 1 or 2, wherein the occupant is a driver of the vehicle.

Example 4: The method of example 1, 2, or 3, wherein determining that the seatbelt is crossing the chest of the occupant comprises determining that a stripe goes from a left shoulder to a right hip of the occupant or from a right shoulder to a left hip of the occupant.

Example 5: The method of any preceding example, wherein the seatbelt portions comprise a first seatbelt portion proximate a shoulder of the occupant and a second seatbelt portion proximate a hip of the occupant.

Example 6: The method of example 5, wherein the occupant portions comprise the shoulder and the hip of the occupant.

Example 7: The method of example 6, wherein the occupant portions at least partially surround their corresponding seatbelt portions.

Example 8: The method of any preceding example, wherein: the relative movements comprise at least one of a relative movement between a shoulder of the occupant and a first seatbelt portion or a relative movement between a hip of the occupant and a second seatbelt portion; the relative movements are under a threshold value; and the establishing that the seatbelt is a fake seatbelt is based on the relative movements being under the threshold value.

Example 9: The method of example 8, wherein establishing that the seatbelt is a fake seatbelt is based further on: at least one of the relative movements being under the threshold value; or an average of the relative movements being under the threshold value.

Example 10: A method comprising: receiving image data over time from one or more cameras with fields of view that include an occupant of a vehicle; inputting at least a portion of the image data into a machine-learned model that is trained to look for relative movement between one or more occupant portions of the occupant and respective seatbelt portions of a seatbelt that correspond to the occupant portions; receiving, from the machine-learned model, an indication that the relative movement indicates that the seatbelt is a fake seatbelt; and outputting, to a vehicle system of the vehicle, an indication of the fake seatbelt.

Example 11: The method of example 10, wherein the portion of the image data corresponds to the occupant portions.

Example 12: A system comprising: one or more image sensors; and at least one processor configured to: receive, from the image sensors, image data of an occupant of a vehicle; determine, based on the image data, that a seatbelt is crossing a chest of the occupant; responsive to determining that the seatbelt is crossing the chest of the occupant: track, based on the image data, one or more occupant portions of the occupant over time; track, based on the image data, one or more seatbelt portions of the seatbelt over time, each of the seatbelt portions corresponding to one of the occupant portions; determine, based on the tracking, relative movements between the occupant portions and their corresponding seatbelt portions; establish, based on the relative movements, that the seatbelt is a fake seatbelt; and output an indication of the fake seatbelt.

Example 13: The system of example 12, wherein the tracking of the seatbelt portions and occupant portions, the determination of the relative movements, and the establishment of the seatbelt as a fake seatbelt are performed via a machine-learned model.

Example 14: The system of example 12 or 13, wherein the image data is infrared image data.

Example 15: The system of example 12, 13, or 14, wherein the occupant is a driver of the vehicle.

Example 16: The system of any of examples 12 to 15, wherein the determination that the seatbelt is crossing the chest of the occupant comprises a determination that a stripe goes from a left shoulder to a right hip of the occupant or from a right shoulder to a left hip of the occupant.

Example 17: The system of any of examples 12 to 16, wherein the seatbelt portions comprise a first seatbelt portion proximate a shoulder of the occupant and a second seatbelt portion proximate a hip of the occupant.

Example 18: The system of any of examples 12 to 17, wherein the occupant portions at least partially surround their corresponding seatbelt portions.

Example 19: The system of any of examples 12 to 18, wherein the establishment of the seatbelt as a fake seatbelt comprises: a determination that at least one of the relative movements is under a threshold value; or a determination that an average of the relative movements is under a threshold value.

Example 20: The system of any of examples 12 to 19, wherein the indication is configured to cause a visual, auditory, or haptic alert to the occupant.

Example 21: A system comprising: at least one processor configured to perform the method of any of examples 1-13.

Example 22: Computer-readable storage media comprising instructions that, when executed, cause at least one processor to perform the method of any of examples 1-13.

Example 23: A system comprising means for performing the method of any of examples 1-13.

Example 24: A method performed by the system of any of examples 14-19.

Example 25: A method comprised by the instructions of example 20.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   receiving, from one or more sensors, sensor data indicating attributes of an interior of a vehicle;
   determining, based on the sensor data, that a seatbelt is crossing a chest of an occupant of the vehicle;
   tracking, based on the sensor data, one or more occupant portions of the occupant over time;
   tracking, based on the sensor data, one or more seatbelt portions of the seatbelt over time, the seatbelt portions corresponding to respective ones of the occupant portions;
   determining, based on the tracking, relative movements between the occupant portions and their corresponding seatbelt portions;
   establishing, based on the relative movements, that the seatbelt is a fake seatbelt; and
   outputting, to a vehicle system of the vehicle, an indication of the fake seatbelt.

2. The method of claim 1, wherein the sensor data comprises visible or infrared image data.

3. The method of claim 1, wherein the occupant is a driver of the vehicle.

4. The method of claim 1, wherein determining that the seatbelt is crossing the chest of the occupant comprises determining that a stripe goes from a left shoulder to a right hip of the occupant or from a right shoulder to a left hip of the occupant.

5. The method of claim 1, wherein the seatbelt portions comprise a first seatbelt portion proximate a shoulder of the occupant and a second seatbelt portion proximate a hip of the occupant.

6. The method of claim 5, wherein the occupant portions comprise the shoulder and the hip of the occupant.

7. The method of claim 6, wherein the occupant portions at least partially surround their corresponding seatbelt portions.

8. The method of claim 1, wherein:
   the relative movements comprise at least one of a relative movement between a shoulder of the occupant and a first seatbelt portion or a relative movement between a hip of the occupant and a second seatbelt portion;
   the relative movements are under a threshold value; and
   the establishing that the seatbelt is a fake seatbelt is based on the relative movements being under the threshold value.

9. The method of claim 8, wherein establishing that the seatbelt is a fake seatbelt is based further on:
   at least one of the relative movements being under the threshold value; or
   an average of the relative movements being under the threshold value.

10. A method comprising:
    receiving image data over time from one or more cameras with fields of view that include an occupant of a vehicle;
    inputting at least a portion of the image data into a machine-learned model that is trained to look for relative movement between one or more occupant portions of the occupant and respective seatbelt portions of a seatbelt that correspond to the occupant portions;
    receiving, from the machine-learned model, an indication that the relative movement indicates that the seatbelt is a fake seatbelt; and
    outputting, to a vehicle system of the vehicle, an indication of the fake seatbelt.

11. The method of claim 10, wherein the portion of the image data corresponds to the occupant portions.

12. A system comprising:
    one or more image sensors; and
    at least one processor configured to:
       receive, from the image sensors, image data of an occupant of a vehicle;
       determine, based on the image data, that a seatbelt is crossing a chest of the occupant;
       responsive to determining that the seatbelt is crossing the chest of the occupant:

track, based on the image data, one or more occupant portions of the occupant over time;

track, based on the image data, one or more seatbelt portions of the seatbelt over time, each of the seatbelt portions corresponding to one of the occupant portions;

determine, based on the tracking, relative movements between the occupant portions and their corresponding seatbelt portions;

establish, based on the relative movements, that the seatbelt is a fake seatbelt; and output an indication of the fake seatbelt.

13. The system of claim 12, wherein the tracking of the seatbelt portions and occupant portions, the determination of the relative movements, and the establishment of the seatbelt as a fake seatbelt are performed via a machine-learned model.

14. The system of claim 12, wherein the image data is infrared image data.

15. The system of claim 12, wherein the occupant is a driver of the vehicle.

16. The system of claim 12, wherein the determination that the seatbelt is crossing the chest of the occupant comprises a determination that a stripe goes from a left shoulder to a right hip of the occupant or from a right shoulder to a left hip of the occupant.

17. The system of claim 12, wherein the seatbelt portions comprise a first seatbelt portion proximate a shoulder of the occupant and a second seatbelt portion proximate a hip of the occupant.

18. The system of claim 12, wherein the occupant portions at least partially surround their corresponding seatbelt portions.

19. The system of claim 12, wherein the establishment of the seatbelt as a fake seatbelt comprises:

a determination that at least one of the relative movements is under a threshold value; or a determination that an average of the relative movements is under a threshold value.

20. The system of claim 12, wherein the indication is configured to cause a visual, auditory, or haptic alert to the occupant.

* * * * *